United States Patent [19]

Furutsu

[11] Patent Number: 4,571,787
[45] Date of Patent: Feb. 25, 1986

[54] TYING DEVICE
[75] Inventor: Akira Furutsu, Tokyo, Japan
[73] Assignees: Japan Bano'k Co., Ltd., Tokyo, Japan; Ben Clements & Sons, Inc., South Hackensack, N.J.
[21] Appl. No.: 642,473
[22] Filed: Aug. 20, 1984
[30] Foreign Application Priority Data
  Dec. 24, 1983 [JP] Japan .......................... 58-204724[U]
  May 4, 1984 [JP] Japan ............................ 59-64756[U]
[51] Int. Cl.$^4$ ............................................ B65D 63/00
[52] U.S. Cl. ....................................... 24/543; 24/544; 24/16 PB; 24/20 EE
[58] Field of Search ............ 24/543, 544, 563, 16 PB, 24/17 AP, 30.5 P, 23 EE

[56] References Cited
U.S. PATENT DOCUMENTS

| | | | |
|---|---|---|---|
| 3,429,985 | 2/1969 | Czigler | 24/543 |
| 3,551,965 | 1/1971 | Gordon | 24/543 |
| 3,744,104 | 7/1973 | Ford | 24/543 |
| 3,837,047 | 9/1974 | Bunnell | 24/16 PB |
| 3,875,619 | 4/1975 | Fortsch | 24/16 PB |
| 4,053,135 | 10/1977 | Saliaris | 24/543 |
| 4,334,659 | 6/1982 | Yuda | 24/17 AP |
| 4,343,066 | 8/1982 | Lance | 24/543 |
| 4,453,295 | 6/1984 | Laszczower | 24/543 |

Primary Examiner—Victor N. Sakran
Attorney, Agent, or Firm—Blum, Kaplan, Friedman, Silberman & Beran

[57] ABSTRACT

In a two-fold type tying device formed of synthetic resin, guide portions 4B in the form of a projection are provided at a portion to be contacted by a rocking arm of a tying machine. This tying device is capable of preventing release of the tying device from the rocking arm or bending member upon tying the tying device by means of the tying machine 15, preferably with the aid of the guide portions 4B and guide slots 4C.

7 Claims, 26 Drawing Figures

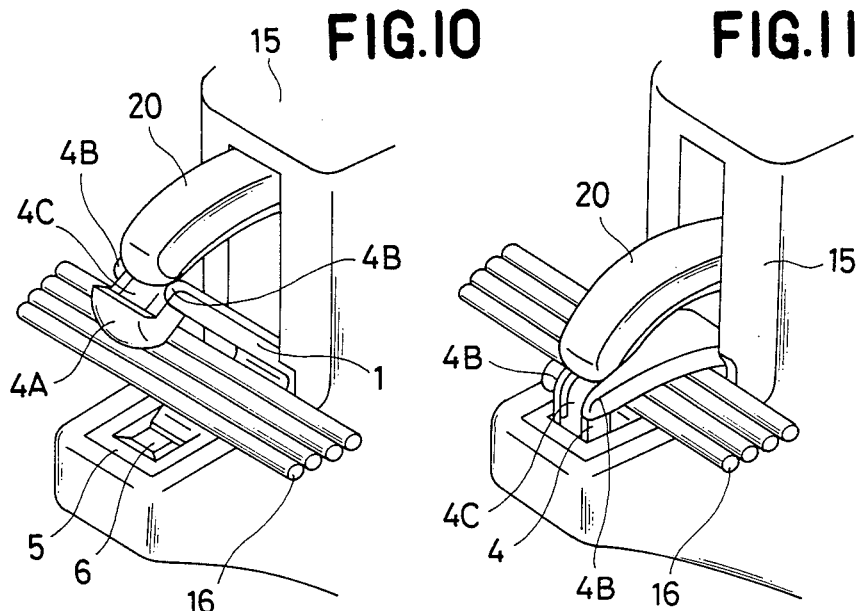
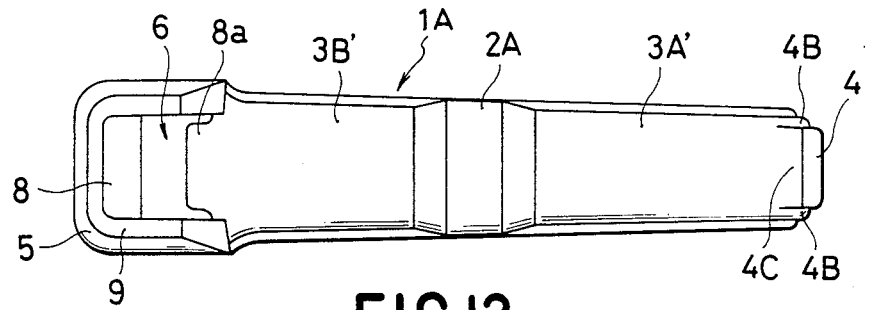
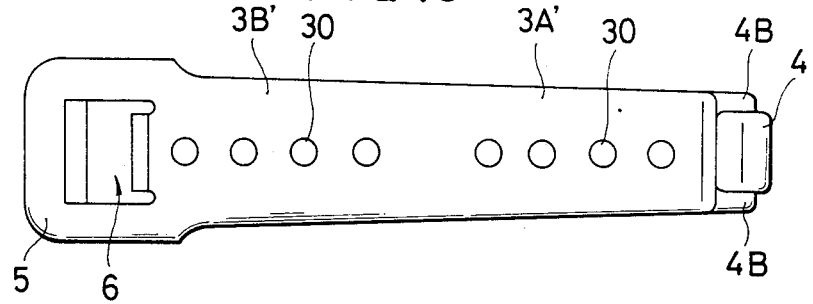

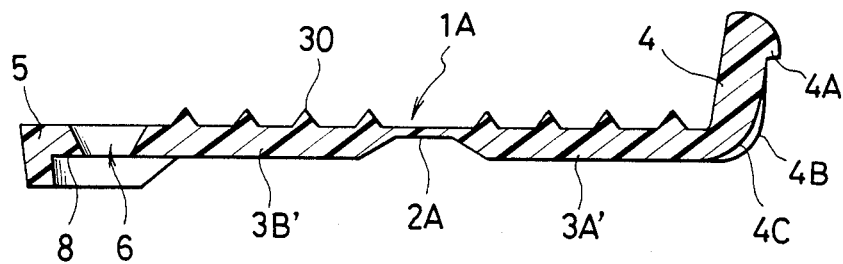
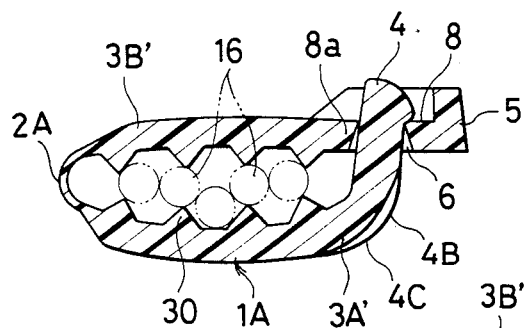
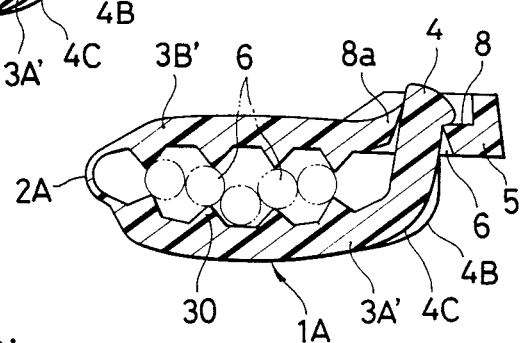
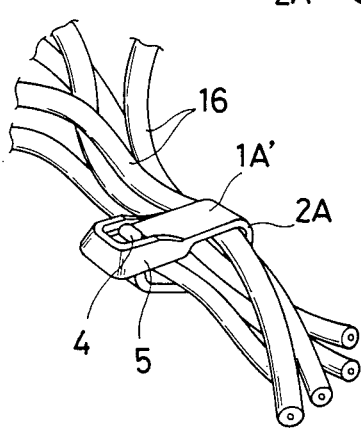

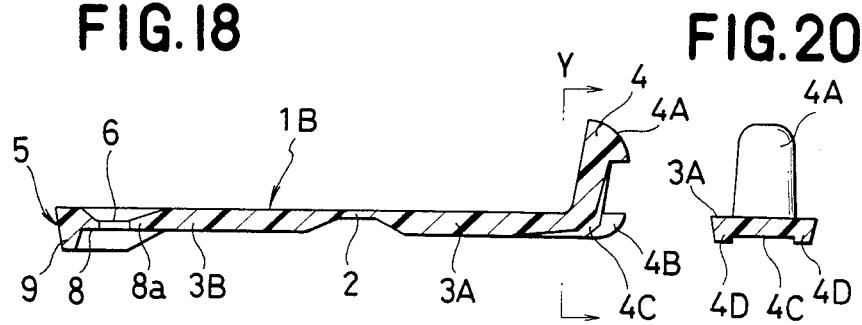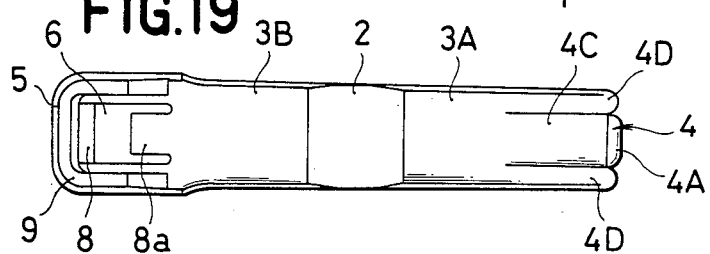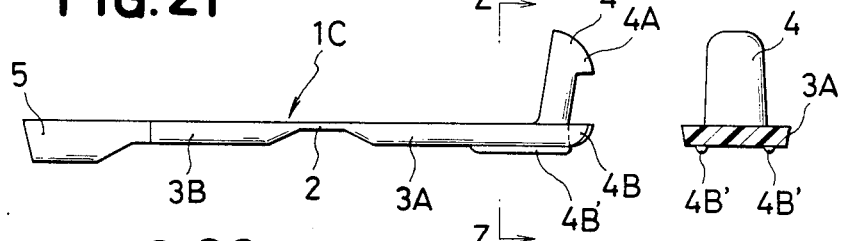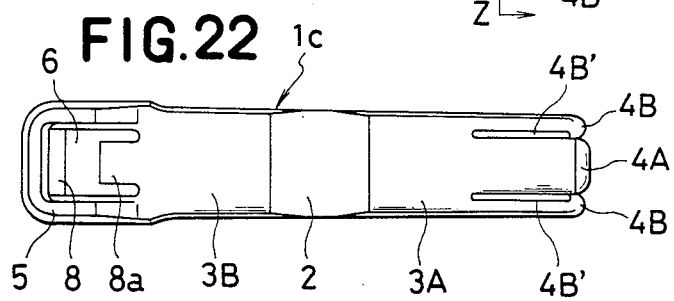

ABOLISH

TYING DEVICE

BACKGROUND

The present invention relates to a tying device made of synthetic resin which is used to tie a plurality of electric wires or similar linear objects, or to close the opening of a bag. More particularly, it provides a tying device which is formed as a band of a thick plate configuration and which may appropriately be loaded in a tying machine wherein the tying device is bent from a thin portion formed at a central part thereof whereby a claw-like first engaging portion comes into engagement with an annular second engaging portion.

There has hitherto been known a tying device made wholly of synthetic resin such as nylon, polypropylene and the like in which it is formed as a band including thick portions and is bent from a thin portion formed at a central part thereof, in which a first engaging portion in the form of a claw or projection is provided at the end of one of the thick portions while an annular second engaging portion is provided at the end of the other thick portion extended from the above-mentioned thick portion via the thin portion, and in which linear objects such as electric wires, filaments, bags or the like are held between the two thick portions and are tied together by inserting the claw-like first engaging portion into the annular second engaging portion.

In such tying device, a considerable amount of biasing force is necessary to engage the first engaging portion with a hole of the second engaging portion. In addition, the tying device per se is of relatively small size. Hence, a tying operation is difficult to perform by hand and a tying machine is thus employed.

The tying machine is provided along the longitudinal axis with a guide slot in which the tying device is fitted. While the objects such as electric wires and the like are placed on the tying device, the tying device is bent from the thin portion so as to hold objects between the two thick portions. In this state, the claw of the first engaging portion is fitted into the engaging hole of the second engaging portion thereby to tie the objects.

In use and operation of the tying machine, it is necessary to push the tying device forward to the front end of the guide slot and to bend the thick portions to a V-configuration by means of rocking action of a rocking arm of bending member which may be moved and rocked forward and backward by a lever thereby to fit the claw of the first engaging portion into the hole of the second engaging portion.

However, in the case of the prior art tying devices, the thick portion pressed upward by means of the rocking arm is often released from the rocking arm in the course of bending the tying device by pressing the under side of one thick portion in the tying device by means of the rocking arm or bending member. In this case, the tying device must be removed from the tying machine once and again fitted therein so as to operate the tying machine. Accordingly, the tying operation may not smoothly be performed. The release of the tying device from the rocking arm tends to increasingly occur as the operational velocity of the tying machine increases.

In the above-mentioned tying machine, a piece of tying device is fitted in the guide slot provided along the longitudinal axis of the tying machine and is moved forward. While the thick portion having the second engaging portion is shifted to the front part of the tying machine in a fixed state, linear objects such as electric wires and the like are placed thereon. Then, the thick portion having the first engaging portion is pressed upward by means of the rocking arm and is further bent against the electric wires or the like while fitting the claw-like first engaging portion formed at the rear thick portion into the annular second engaging portion of the thick portion positioned under the electric wires or the like.

Problems to be faced in this tying machine are such that a considerable amount of force is required to bend the tying device along the longitudinal axis thereof and the tying operation must instantaneously be performed. In the prior art tying device, however, the under side of the thick portion is in the form of a plane and the rocking arm or bending member is in the form of a plate. In this construction, when the under side of the thick portion in the tying device is pressed by the end surface (in the thickness direction of a plate) of the rocking arm, the under side of the thick portion to be bent is liable to slip from the rocking arm. As a result, the tying operation may not properly be performed or is totally impossible.

SUMMARY

It is a primary object of the present invention to provide a tying device which may not possibly be released from a rocking arm or bending member when a tying action takes place by means of the prior art two-fold type tying device made of synthetic resin loaded in a tying machine thereby to overcome improper tying, and which may appropriately be loaded or fitted in the tying machine.

It is another object of the present invention to provide a tying device which may readily hold linear articles or objects such as electric wires to be tied.

In order to achieve the foregoing objects, tying device according to the present invention is constructed by thick portions extended from both sides of a thin portion, a first engaging portion in the form of a projection provided at the end part of one thick portion and an annular second engaging portion provided at the end part of the other thick portion, and a claw formed at the first engaging portion being engaged with a tongue projecting in an engaging hole of the second engaging portion, and is characterized in that either guide portions or the guide portions and a guide slot are provided in the tying device at a portion to be contacted by a rocking arm or bending member of a tying machine so as to prevent release of the tying device from this rocking arm or bending member by guiding the same.

THE DRAWINGS

FIGS. 10 and 11 are respectively a perspective view of essential parts of a tying machine, showing conditions in which a tying device according to the present invention is fastened;

Figure 24:
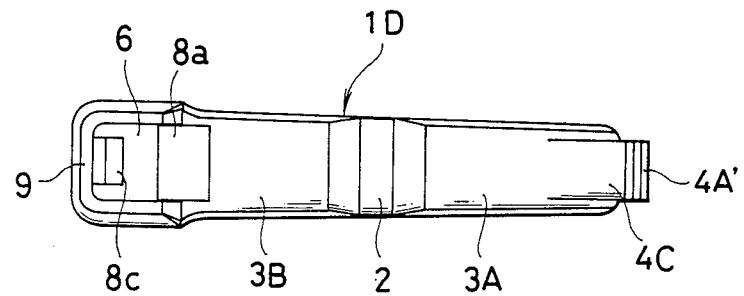
Figure 25:
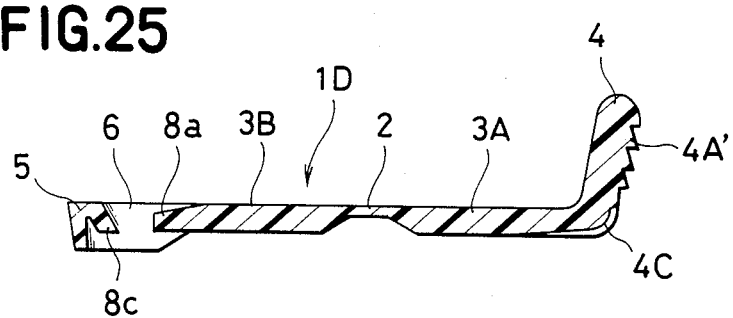
Figure 26:
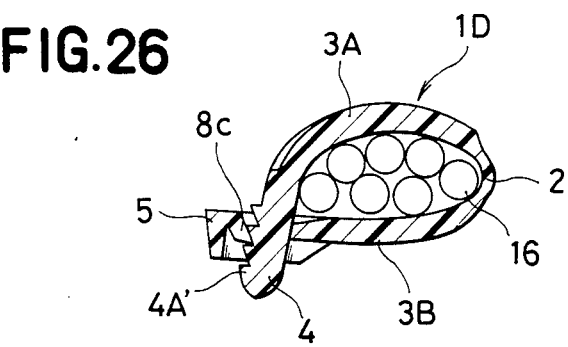

FIGS. 12 through 17 respectively show a tying device according to a second embodiment of the invention, in which FIG. 12 is a rear view of the tying device;

FIG. 13 a front view of the tying device in FIG. 12;

FIG. 14 is a sectional view of the tying device in FIG. 12;

FIG. 15 is a sectional side view, showing a state in which electric wires are tied altogether by means of the tying device;

FIG. 16 is a perspective view, showing a state in which electric wires are tied altogether by means of the tying device;

FIG. 17 is a sectional view, explaining operation of a holding piece of the tying device in the course of a tying action;

FIGS. 18 through 20 respectively show a tying device according to a third embodiment of the present invention, in which FIG. 18 is a sectional view of the tying device;

FIG. 19 is a rear view of the tying device;

FIG. 20 is a sectional side view taken along the line Y—Y of FIG. 18;

FIGS. 21 through 23 respectively show a tying device according to a fourth embodiment of the present invention, in which FIG. 21 is a side view of the tying device;

FIG. 22 is a rear view of the tying device;

FIG. 23 is a side view taken along the line Z—Z of FIG. 21;

FIGS. 24 through 26 respectively show a tying device according to a fifth embodiment of the present invention, in which FIG. 24 is a rear view of the tying device;

FIG. 25 is a sectional view of the tying device; and

FIG. 26 is a sectional view showing a state in which objects are tied by the use of the tying device.

THE PREFERRED EMBODIMENTS

The preferred embodiments of the present invention will now be described with reference to the accompanying drawings.

(EMBODIMENT 1)

In a first embodiment, a tying device 1 in the form of a band carries a thin portion 2 at a central part thereof and thick portions 3A and 3B extended from both sides of the thin portion 2 as shown in FIGS. 1 through 4. At the end part of the thick portion 3A is formed a first engaging portion 4 in the form of a projection. On the other hand, an annular second engaging portion 5 is formed at the end part of the thick portion 3B so as to receive the first engaging portion 4, and an engaging hole 6 is formed at a central part thereof.

Figure 1:
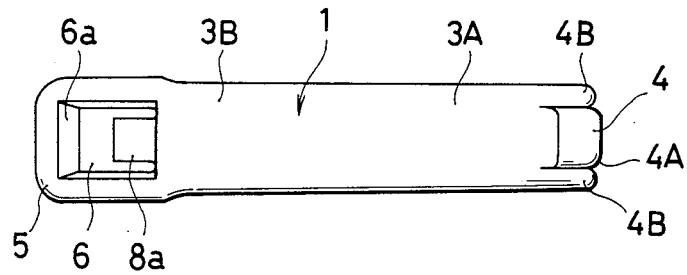
FIG. 1 is a front view of a tying device according to a first embodiment of the present invention.
Figure 2:
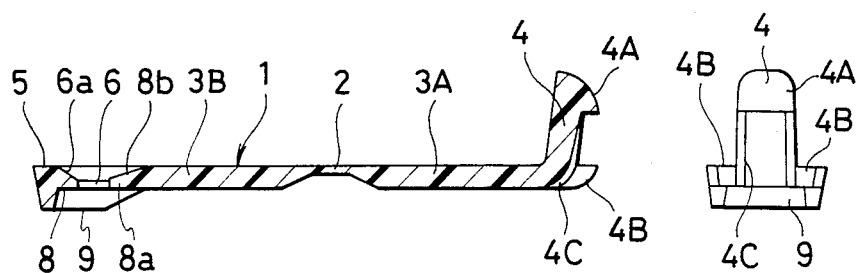
FIG. 2 is a sectional side view of the tying device in FIG. 1.
Figure 4:
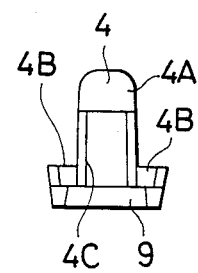
FIG. 4 is a side view of the tying device in FIG. 1 as viewed from a first engaging portion.

The first engaging portion 4 has a claw 4A which projects outward as shown in FIG. 2. When the claw 4A is inserted into the engaging hole 6, it is adapted to be caught by a tongue 8 in the engaging hole 6. In this connection, a holding piece 8a is provided at the opposite side of the tongue 8 so as to prevent release of the first engaging portion 4. Further, an inclined surface 6a is formed at the entrance side of the engaging hole 6 so as to facilitate smooth insertion of the first engaging portion 4 and an inclined surface 8b is also formed at the holding piece 8a.

Guide portions 4B which pertain to characteristics of the present invention project outward from the thick portion 3A in which the first engaging portion 4 is provided. Further, guide slots 4C as modifications of the guide portions are formed at the under side of the thick portion 3A.

The guide portions 4B constitute integral parts of the tying device 1 according to the present invention. The guide portions 4B are positioned at both sides of a rocking arm 20 (or a bending member) in a tying machine 15 (FIGS. 10 and 11) and serve to prevent the tying device 1 from being released from the rocking arm 20. Further, the guide slots 4C formed between these guide portions 4B have the same function as the guide portions 4B do. In the first embodiment shown in FIGS. 1 through 4, both guide portions 4B and guide slots 4C are provided so that the above-mentioned functions are obtainable. It is to be noted that the guide portions 4B may be of a size slightly larger than those shown in FIGS. 1 through 4.

Figure 3:
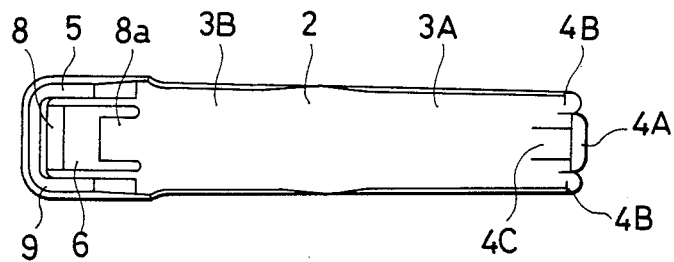
FIG. 3 is a rear view of the tying device in FIG. 1.

As shown in FIGS. 2 and 3, the engaging hole 6 is formed at a central part of the second engaging portion 5 provided in opposite relation to the first engaging portion 4 and the tongue 8 projects inward in the engaging hole 6. Additionally, a substantially U-shaped surrounding portion 9 is so formed as to surround the tongue 8. When the first engaging portion 4 is fitted into the engaging hole 6, the surrounding portion 9 is intended to prevent the claw 4A from being released upon hitting other objects by surrounding the claw 4A which projects from the under side of the engaging hole 6.

The tying operation with the tying device 1 according to the present invention will now be described in connection with the tying machine.

Figure 5:
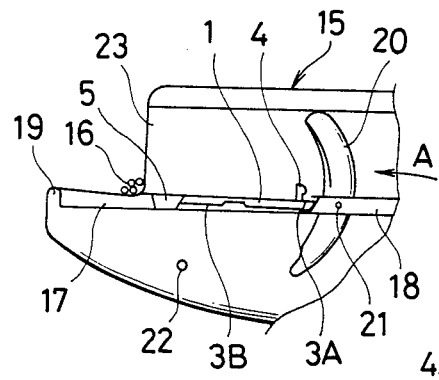
FIGS. 5 through 7 show sequential tying operations with the tying device done with use of a tying machine.

As shown in FIG. 5, the tying device 1 is loaded in the tying machine 15. By initiating a lever (not shown) of the tying machine 15, linear objects 16 such as electric wires or the like are tied altogether while nipping them between the thick portions 3A and 3B.

In FIG. 5, there is shown a first stage of the tying operation wherein the tying device 1 is fed into a guide slot 17 provided along the longitudinal axis of the tying machine 15 of a substantially pistol-shape and a push lever 18 is forwarded in the direction of an arrow A by means of the lever (not shown) thereby to move the thick portion 1A in the tying device 1 to the end part of the guide slot 17.

Normally, a plurality of tying devices 1 are laterally arranged for reasons of molding and handling ease: The tying devices 1 are interconnected by means of connecting pieces, which are integrally formed of industrial synthetic resin such as nylon, polypropylene and the like. In the tying operation, a group of tying devices 1 thus formed are loaded in the tying machine 15 from a lateral direction and are successively fed by means of the lever while being individually successively severed.

In FIG. 5, there is shown a single tying device 1 which is fed into the guide slot 17 after it is separated from a group of tying device 1.

The tying machine 15 is carries the guide slot 17 in which the tying device 1 is fitted. In addition, a stop portion 19 projects from the front end of this guide slot 17 in a manner to receive the same. Further, the push lever 18 is provided with the rocking arm 20 which rocks with respect to a pin 21. While the rocking arm 20 moves in the direction of the arrow A along with the push lever 18, the end part of the thick portion 3A in the tying device 1 is pressed by a central part of the rocking arm 20 or the front end of the push lever 18 whereby the thick portion 3A in the tying device 1 is bent to a V-configuration as shown in FIG. 6 from a state as shown in FIG. 5.

Figure 6:
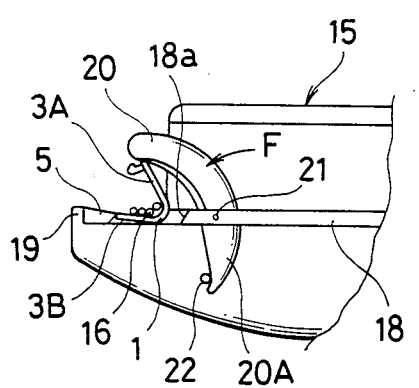

In the course of the operation shown in FIG. 5 through FIG. 6, an end portion 20A of the rocking arm 20 comes into abutment with a stop pin 22 whereby its movement is regulated. As a result, the rocking arm 20 is turned counterclockwise thereby to bend the tying device 1. Accordingly, when the push lever 18 is further moved while the end portion 20A of the rocking arm 20 is in abutment with the stop pin 22, the rocking arm 20 is turned in the direction of an arrow F (FIG. 6).

A receiving portion 23 is provided at the front end of the tying machine 15 (FIG. 5) and electric wires 16, as objects to be tied, are guided or held therein.

When the tying device 1 shown in FIG. 5 is pushed in the direction of the arrow A by means of the push lever 18, the end portion 20A of the rocking arm 20 comes into abutment with the stop pin 22 whereby its movement is regulated. Upon further forward movement of the push lever 18, the rocking arm 20 is turned in the direction of the arrow F thereby to press the thick portion 3A in the tying device 1 upward against the thick portion 3B via the thin portion 2. The tying device 1 is thus bent to a V-configuration.

Figure 7:
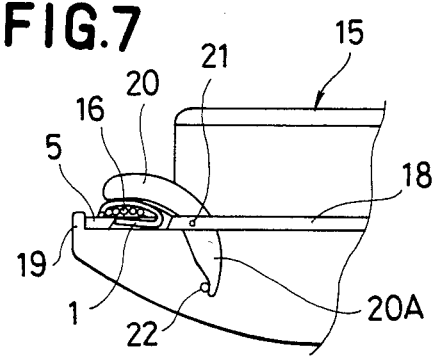

In FIG. 6, the thick portion 3A is pressed upward by means of an inclined surface 18a formed at the front end of the push lever 18 (or the central part of the rocking arm 20) and subsequently thereafter, it is bent to a V-configuration by means of the rocking arm 20. When the push lever 18 is further moved forward, the rocking arm 20 abruptly leans forward as shown in FIG. 7 and thus, the claw 4A of the first engaging portion 4 is inserted into the engaging hole 6 of the second engaging portion 5 under pressure. In this manner, the claw 4A comes into engagement with the tongue 8.

Figure 8:
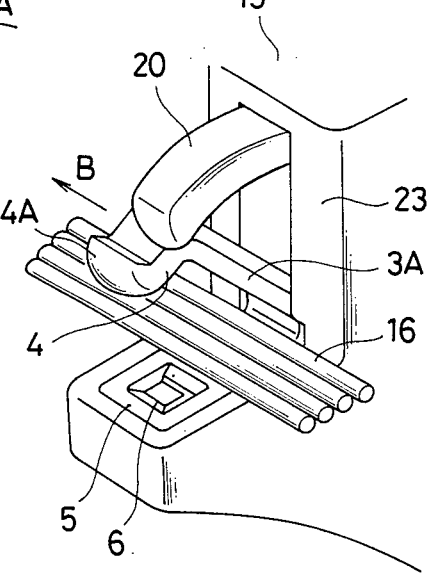
FIG. 8 is a perspective view of essential parts of a tying machine, showing a state in which the prior art tying is not satisfactorily fastened.
Figure 9:
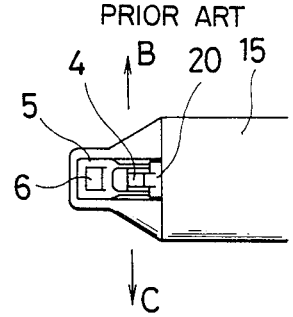
FIG. 9 is a plan view of essential parts of the tying machine shown in FIG. 8.

In the prior art tying device, as shown in FIG. 8 the thick portion 3A provides, on its under side, no means for preventing release of the rocking arm 20. As the thick portion 3A is in the form of a plane, when it is pressed upward by means of the rocking arm 20, it tends to escape in a lateral direction as shown by an arrow B in FIG. 8 or arrows B and C in FIG. 9 while bending the tying device 1. Accordingly, the claw 4A of the first engaging portion 4 may not readily be inserted into the engaging hole 6 under pressure.

According to the first embodiment of the present invention, the tying device 1 is constructed as shown in FIG. 1 through FIG. 4 and is characterized in that the guide portions 4B in the form of a projection are so provided at the under side of each of the first engaging portion 4 and the thick portion 3A, specifically at a portion where they are joined, as to guide the rocking arm 20 and the guide slots 4C are formed between these guide portions 4B.

As mentioned above, the guide portions 4B in the form of a projection are provided at both sides of the first engaging portion 4 to be pressed by the rocking arm 20 in the tying machine 15 and the guide slots 4C are provided as well. Thus, as is clear in FIG. 10 corresponding to FIG. 8, both sides of the rocking arm 20 are respectively held by the guide portions 4B so that the thick portion 3A in the tying device 1 may not be released from the rocking arm 20. As shown in FIG. 11, the first engaging portion 4 is smoothly and accurately inserted into the engaging hole 6 in the second engaging portion whereby the claw 4A comes into engagement with the tongue 8 projecting inward in the engaging hole 6. Accordingly, the electric wires 16 are tied altogether as a result of bending of the tying device 1.

Once the tying device 1 is in the fastened position, the claw 4A of the first engaging portion 4 projects from the under side of the second engaging portion 5. However, since the claw 4A is protected by the surrounding portion 9, the tied position may not readily be released.

(EMBODIMENT 2)

A second embodiment of the present invention will now be described with reference to FIG. 12 through FIG. 14.

In FIGS. 12 through 14, there is shown a tying device 1A integrally formed of synthetic resin according to the present invention. The tying device 1A carries a thin portion 2A at a central part thereof and thick portions 3A' and 3B' at the right and left side portions respectively, and may be bent via the thin portion 2A as is done with the first embodiment.

A plurality of projections 30 (in the form of a cone in this embodiment) are disposed at equal intervals on the upper sides of each of the thick portions 3A' and 3B'. These projections 30 are so provided as to securely hold fine electric wires or bags and the interval, size and shape of the projections 30 are determined depending upon the shape and size of objects to be tied. Further, the guide portions 4B are formed at both sides of the first engaging portion 4.

Upon tying electric wires by means of this tying device, a plurality of electric wires are nipped by the tying device 1A whose side carries the projections 30 as shown in FIG. 15. In this state, the first engaging portion 4 is inserted into the engaging hole 6 in the second engaging portion 5 whereby the electric wires are automatically tied altogether.

Upon this engagement, the projections 30 bite a part of the electric wires 16. Thus, the electric wires 16 are integrally tied altogether and are prevented from escaping in a longitudinal direction as shown in FIG. 16.

When the first engaging portion 4 is inserted into the hole 6 of the second engaging portion 5, the first engaging portion 4 is adapted to press a resilient holding piece 8a thereby to bend the same. Thus, the first engaging portion 4 may readily pass through the engaging hole 6 as shown in FIG. 17. Once the first engaging portion 4 passes through the engaging hole 6, the resilient holding piece 8a is returned to its original state and then presses the first engaging portion 4 onto the tongue 8. Accordingly the claw 4A is tightly engaged with the tongue 8 and thus may not be released therefrom.

Also, in this second embodiment, the guide portions 4B and guide slots 4C are provided thereby to guide the rocking arm 20.

(EMBODIMENT 3)

In FIGS. 18 through 20, there is shown a third embodiment of the present invention wherein the guide slots 4C are formed longer over the under side of each of the thick portion 3A in a tying device 1B, and the first engaging portion 4 and the guide portions 4B in the form of a projection are formed at a portion where the first engaging portion 4 and the thick portion 3A are joined.

The characteristics of this embodiment is such that the guide slots 4C are provided fairly longer.

(EMBODIMENT 4)

In FIGS. 21 through 23, there is shown a fourth embodiment of the present invention. This embodiment is characterized in that a tying device 1C is provided with two guide portions 4B' in the form of a projection on the under side of the thick portion 3A, and the guide portions 4B are provided at both sides of a portion where the first engaging portion 4 and the thick portion 3A are joined.

(EMBODIMENT 5)

In FIGS. 24 through 26, there is shown a fifth embodiment of the present invention. In a tying device 1D according to this embodiment, the first engaging portion 4 is provided with a plurality of claws 4A'. Further, a tongue 8C is rockably provided in the engaging hole 6 in the second engaging portion 5. In this construction, as shown in FIG. 26 an engaging state by the tongue 8C and claws 4A' may be changed depending upon the number of electric wires 16 or the size of an object or objects to be tied, and the tying operation may readily be performed due to small rocking motion of the tongue 8C.

In this embodiment, the guide slots 4C are formed at a portion where the first engaging portion 4 and the thick portion 3A are joined thereby to guide the end surface of the rocking arm in the tying machine.

The tying device according to the present invention is characterized in that the guide portions 4B are provided in the tying device whose side is provided with the first engaging portion 4, and the guide slots 4C are provided between the guide portions 4B, and in that the guide portions 4B and guide slots 4C are adapted to guide the end surface of the rocking arm or bending member 20 in the tying machine 15 thereby to prevent release thereof.

As the guide portions 4B is formed at both sides of a portion in the thick portion 3A at the side of the first engaging portion to be pressed by the rocking arm 20 of the tying machine 15 and the guide slots 4C which function in the same manner as the guide portions 4B are provided, the first engaging portion 4 is securely inserted into the engaging hole 6 in the second engaging portion 5 thereby to engage the claw 4A with the tongue 8. Thus, the tying device may be properly fastened.

According to the present invention, the tying device 1 may securely the guided by the rocking arm 20 of the tying machine 15. Hence, failure of the tying operation may be effectively avoided and the tying device may be successively effectively fastened.

I claim:

1. A tying device integrally formed of synthetic resin and adapted to be closed by a tying maching having a bending member comprising a member having a thin portion and first and second thick portions extending respectively from opposite sides of said thin portion, said first thick portion having a first engaging portion of an essentially L-shaped cross-section, said second thick portion including a corresponding second engaging portion having an engaging hole formed therein and adapted to receive said first engaging portion to close said tying device, said first thick portion including first and second guide portions which extend off the end of said first thick portion respectively on opposite sides of said first engaging portion, said guide portions acting to prevent said first thick portion from sliding off of said bending member of said tying machine when said tying device is being closed by said tying machine, said guide portions extending on opposite sides of said second engaging member but not in said engaging hole when said device is closed.

2. A tying device according to claim 1, wherein the guide portions adapted to guide the bending member in the tying device are provided at a joined part of the first engaging portion and the first thick portion, said guide portions being in the form of a projection.

3. A tying device according to claim 1, wherein guide slots are formed in the vicinity of a connected part of the first engaging portion and the first thick portion said guide slots being adapted to guide the bending member in the tying machine.

4. A tying device according to claim 1, wherein projections are provided at the surface of the first and second thick portions where objects to be tied are held so as to prevent escape of the objects to be tied.

5. A tying device according to claim 1, wherein the guide portions in the form of a projection are provided at the under side of the first thick portion where the first engaging portion is provided.

6. A tying device according to claim 1, wherein guide slots are formed at the surface of the first engaging portion.

7. A tying device according to claim 1, wherein a plurality of claws are formed at the first engaging portion and a tongue is formed at the second engaging portion, said claws being engaged with the tongue.

* * * * *